United States Patent
Lim

(10) Patent No.: US 7,512,270 B2
(45) Date of Patent: Mar. 31, 2009

(54) METHOD OF IMAGE SEGMENTATION

(75) Inventor: Dong-keun Lim, Suwon-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 624 days.

(21) Appl. No.: 11/193,463

(22) Filed: Aug. 1, 2005

(65) Prior Publication Data

US 2006/0045336 A1   Mar. 2, 2006

(30) Foreign Application Priority Data

Aug. 30, 2004   (KR) .................. 10-2004-0068612

(51) Int. Cl.
*G06K 9/34* (2006.01)

(52) U.S. Cl. .................................. 382/173

(58) Field of Classification Search ............. 348/14.12, 348/25; 345/418–419, 421, 428, 581–583, 345/586, 606–607, 610, 619, 629; 382/173, 382/215, 285, 294–299
See application file for complete search history.

(56) References Cited

U.S. PATENT DOCUMENTS

| 5,863,980 | A | 1/1999 | Choi et al. | 524/591 |
| 5,963,209 | A | 10/1999 | Hoppe | 345/419 |
| 6,044,168 | A * | 3/2000 | Tuceryan et al. | 382/118 |
| 6,281,903 | B1 * | 8/2001 | Martin et al. | 345/421 |
| 6,285,372 | B1 * | 9/2001 | Cowsar et al. | 345/420 |
| 6,438,275 | B1 * | 8/2002 | Martins et al. | 382/300 |
| 6,750,873 | B1 * | 6/2004 | Bernardini et al. | 345/582 |
| 6,858,826 | B2 * | 2/2005 | Mueller et al. | 250/208.1 |

FOREIGN PATENT DOCUMENTS

| JP | 08-030008 | 2/1996 |
| JP | 2000-167481 | 6/2000 |
| JP | 2001-350802 | 12/2001 |
| JP | 2003-346177 | 12/2003 |
| KR | 10-2003-0017888 | 3/2003 |

* cited by examiner

*Primary Examiner*—Jose L Couso
(74) *Attorney, Agent, or Firm*—Staas & Halsey LLP

(57) ABSTRACT

An image segmentation method including: selecting a region of interest including an object whose image is to be segmented; detecting the edge of the object; repeatedly performing, until a specified precision is obtained, a process in which by using a layered mesh structure based on the detected edge, a mesh boundary of the object is detected, a mesh size is reduced by one layer, and then by using areas adjacent to the detected mesh boundary, correcting the mesh boundary; and generating a mask to fill a inside area of the correcting mesh boundary and masking the object.

17 Claims, 9 Drawing Sheets

FIG. 2
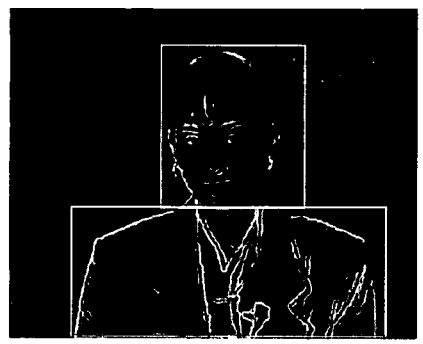
(A) USE OF QUADRANGLE
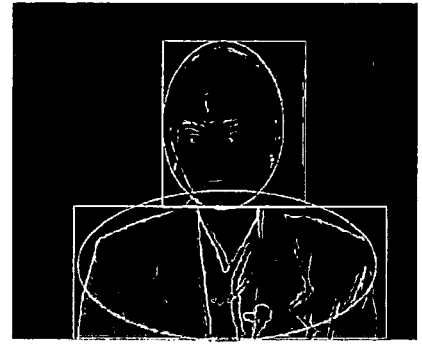
(B) USE OF QUADRANGLE AND OVAL
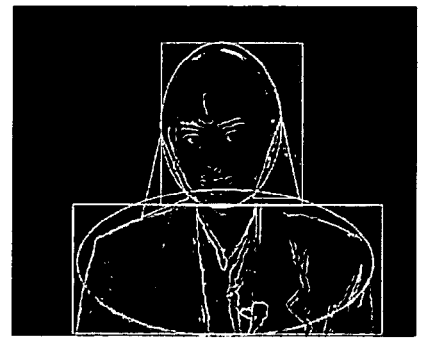
(C) USE OF POLYGON
(D) USE OF HAND-DRAWN LINES
FIG. 3
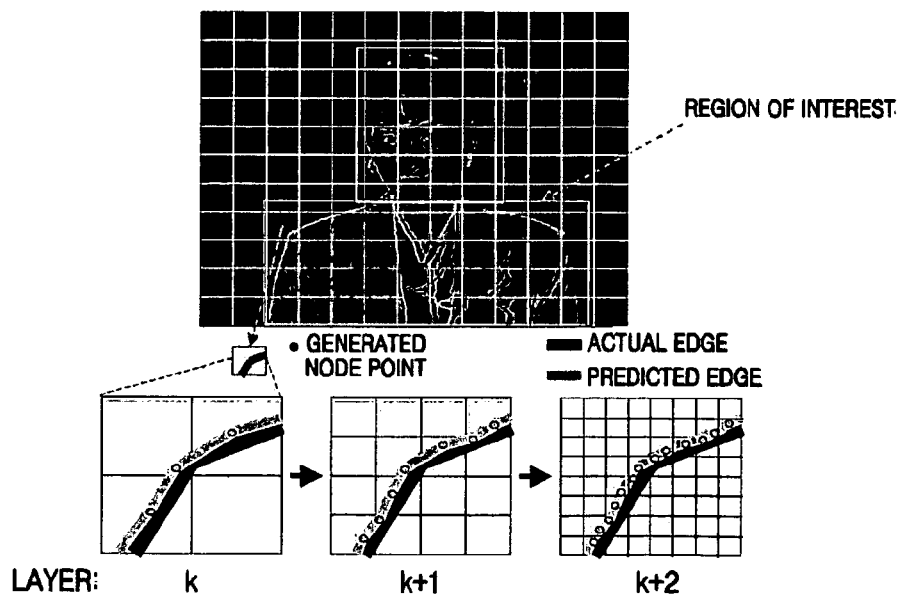

(A) LAYER k
(B) LAYER k+1
(C) LAYER k+2

—— BOUNDARY LINE OF OBJECT
----- PREDICTED BOUNDARY LINE (A)     (B)

FIG. 6

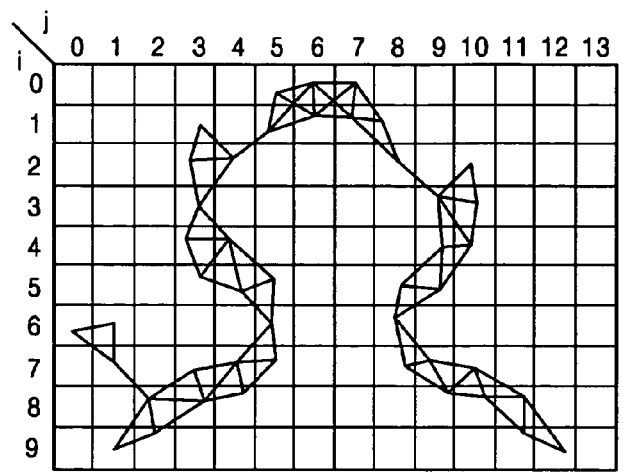

FIG. 7

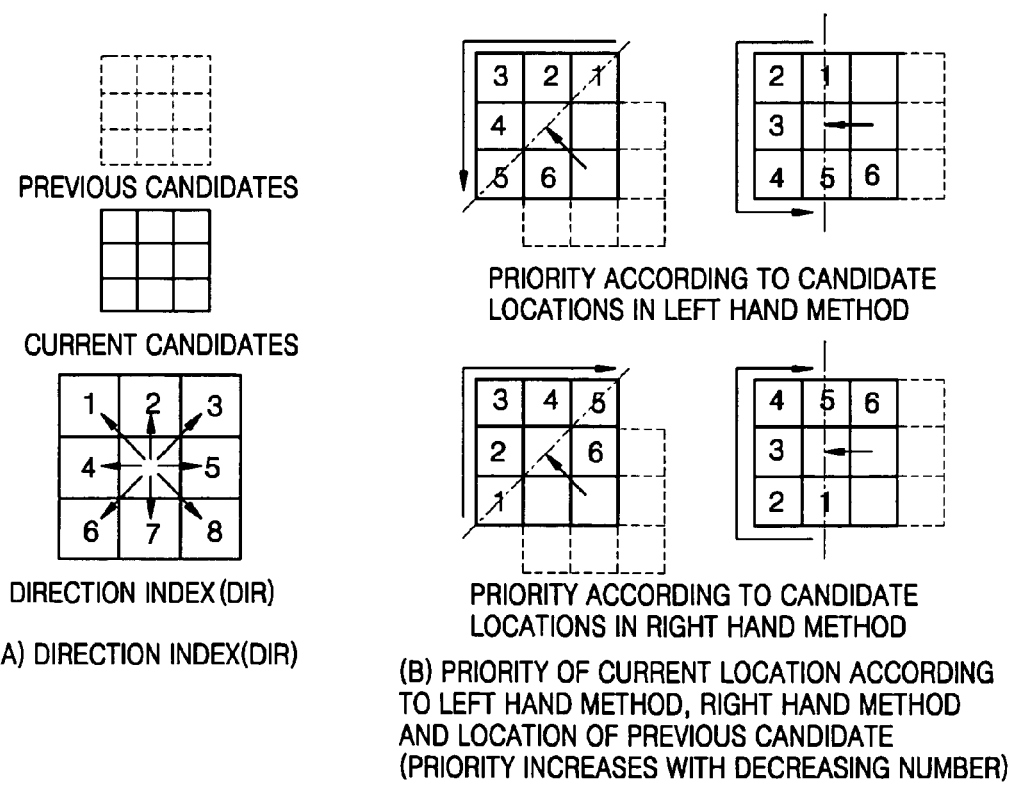

PREVIOUS CANDIDATES

CURRENT CANDIDATES

DIRECTION INDEX (DIR)

(A) DIRECTION INDEX(DIR)

PRIORITY ACCORDING TO CANDIDATE LOCATIONS IN LEFT HAND METHOD

PRIORITY ACCORDING TO CANDIDATE LOCATIONS IN RIGHT HAND METHOD (B) PRIORITY OF CURRENT LOCATION ACCORDING TO LEFT HAND METHOD, RIGHT HAND METHOD AND LOCATION OF PREVIOUS CANDIDATE (PRIORITY INCREASES WITH DECREASING NUMBER)

FIG. 8

(A) PRIORITY ACCORDING TO DIRECTION INDEX IN LEFT HAND METHOD (B) PRIORITY ACCORDING TO DIRECTION INDEX IN RIGHT HAND METHOD

FIG. 9

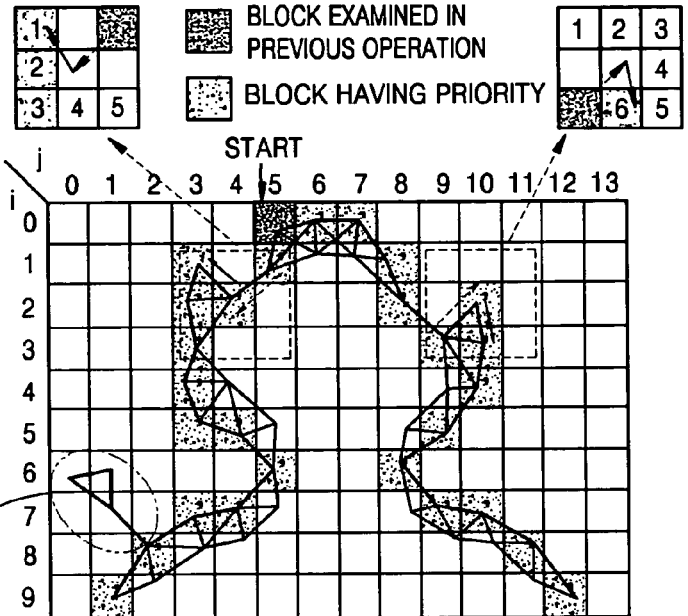

(A) EXAMPLE IMAGE FOR EXPERIMENT FOR OBJECT BOUNDARY DETECTION

| NUMBER | LOCATION | DIR | DETECTION METHOD | NUMBER | LOCATION | DIR | DETECTION METHOD |
|---|---|---|---|---|---|---|---|
| 0 | (0,5) | 7 | LEFT HAND METHOD | 17 | (8,2) | 8 | LEFT HAND METHOD |
| 1 | (1,5) | 6 | LEFT HAND METHOD | 18 | (9,1) | 6 | LEFT HAND METHOD |
| 2 | (2,4) | 1 | LEFT HAND METHOD | 19 | (0,5) | 5 | RIGHT HAND METHOD |
| 3 | (1,3) | 7 | LEFT HAND METHOD | 20 | (0,6) | 5 | RIGHT HAND METHOD |
| 4 | (2,3) | 7 | LEFT HAND METHOD | 21 | (0,7) | 8 | RIGHT HAND METHOD |
| 5 | (3,3) | 7 | LEFT HAND METHOD | 22 | (1,8) | 7 | RIGHT HAND METHOD |
| 6 | (4,3) | 7 | LEFT HAND METHOD | 23 | (2,8) | 8 | RIGHT HAND METHOD |
| 7 | (5,3) | 7 | LEFT HAND METHOD | 24 | (3,9) | 3 | RIGHT HAND METHOD |
| 8 | (5,4) | 5 | LEFT HAND METHOD | 25 | (2,10) | 7 | RIGHT HAND METHOD |
| 9 | (6,5) | 8 | LEFT HAND METHOD | 26 | (3,10) | 7 | RIGHT HAND METHOD |
| 10 | (7,4) | 6 | LEFT HAND METHOD | 27 | (4,10) | 6 | RIGHT HAND METHOD |
| 11 | (7,3) | 4 | LEFT HAND METHOD | 28 | (5,9) | 6 | RIGHT HAND METHOD |
| 12 | (8,2) | 6 | LEFT HAND METHOD | 29 | (6,8) | 8 | RIGHT HAND METHOD |
| 13 | (7,1) | 1 | LEFT HAND METHOD | 30 | (7,9) | 5 | RIGHT HAND METHOD |
| 14 | (6,1) | 2 | LEFT HAND METHOD | 31 | (7,10) | 8 | RIGHT HAND METHOD |
| 15 | (6,0) | 4 | LEFT HAND METHOD | 32 | (8,11) | 8 | RIGHT HAND METHOD |
| 16 | (7,1) | 6 | LEFT HAND METHOD | 33 | (9,12) |  | STOP |

(B) BOUNDARY DETECTION RESULT TABLE

METHOD OF IMAGE SEGMENTATION

CROSS-REFERENCE TO RELATED APPLICATION

This application claims the priority of Korean Patent Application No. 2004-0068612, filed on Aug. 30, 2004 in the Korean Intellectual Property Office, the disclosure of which is incorporated herein by reference.

BACKGROUND OF THE INVENTION

1. Field of the Invention

The present invention relates to a method of image segmentation, and more particularly, to an image segmentation method using a layered mesh structure.

2. Description of Related Art

Image segmentation is a technology extracting an object by classifying pixels that are elements of an image, and finding the boundary of the object in the image. For example, in order to find the shape and size of an object matter in an image, the image should be divided into two areas, an object and a background. The object plays an important role in interpretation and expression of an image. In particular, in an MPEG-4 visual standard, an image is coded in units of objects. This technology is referred as an object-based coding. When necessary, a variety of editing techniques for an object, such as combination, removal, and modification of an object, can be used so that an image can be reproduced or efficiently compressed.

For example, there can be seen frequently application examples using image segmentation, such as weather forecast providing weather services with a background of a virtual screen of a weather map, and an image field processed and shown by combining an object with a different background such as a virtual studio. The very core technology enabling these applications is an image segmentation technology extracting only a desired object and combining the object with a screen with a different background.

However, the image segmentation processing using a computer is a difficult engineering problem because there is no clear boundary between each image and the characteristic of each image is different. So far, a masking technology has been developed, and in the masking technology, a homogenous region having similar values is identified based on the characteristics of an image such as luminance, edge information, and geometrical information in an image, and regions having similar characteristics among the identified regions are combined. Then, by using the whole of combined regions, an image is masked.

As leading image segment algorithms developed so far, there are a threshold method, a region growing method, a split-and-merge method, a watershed method, and an edge-based method. Each method has its own characteristics and application fields.

First, the threshold method is the one that uses a threshold to divide an image into a part having values larger than the threshold and a part having values smaller than the threshold, to distinguish an object. However, there is a problem that it is difficult to practically apply the threshold method to a natural image, and the threshold method can be applied only to a binary image. Also, with the threshold method, it is impossible to extract only a specified region of interest in an image.

Next, the region growing method is the one that takes an arbitrary location in an image as a seed, and with this seed as a center, a region having similar characteristics such as luminance, edge, and color, is searched for. That is, when the characteristics of a small region being processed are the same as those of an adjacent small region, the regions are combined into one region and by expanding regions having the same characteristics little by little, image segmentation is performed ultimately for the entire image.

The split-and-merge method is the one that divides a region into small areas of a size to have similar characteristics, and if an area has characteristics similar to those of an adjacent area when compared, the two areas are combined into one, and this process is repeatedly performed.

However, the region growing method and the split-and-merge method described above require a huge amount of computation and repetition in order to search the entire image for regions having identical characteristics, and despite these efforts, there is a problem that it is difficult to extract an object with a desired precision.

Meanwhile, the watershed method is an improvement of the region growing method in which a process dividing an image into many regions and recombining simultaneously by using a plurality of seeds is repeatedly performed to gradually approach to a desired precision. However, for image segmentation with a desired precision, a huge amount of computation is required. Also, a fragmentation problem can occur at the boundary of an image. That is, the problem that part of an object is cut off or part of another object is overlapping can occur. Furthermore, in order to find the boundary of a continuous object, a huge amount of computation is required and in some cases, the method fails to find a continuous boundary.

As described above, while the image segmentation technologies developed so far require a huge amount of computation in order to extract an object, fragmentation occurs in the technologies such that an object cannot be extracted accurately, for example, part of an object is cut off or part of another object is incorrectly included, or it is unable to find a continuous boundary.

BRIEF SUMMARY

An aspect of the present invention provides an image segmentation method using a layered mesh structure, that is, an image segmentation method by which by using a layered mesh structure, the amount of computation can be reduced and an accurate and continuous object boundary can be detected.

According to an aspect of the present invention, there is provided an image segmentation method including: selecting a region of interest including an object whose image is desired to be segmented; detecting the edge of the object in the region of interest; until a specified precision is obtained, repeatedly performing a process in which by using a layered mesh structure based on the detected edge, the mesh boundary of the object is detected, the mesh size is reduced by one layer, and then by using areas adjacent to the detected mesh boundary, correcting the mesh boundary; and generating a mask to fill the inside area of the correct mesh boundary and masking the object.

The region of interest may be selected by combining at least one region distinguished by a circle, an oval, a polygon, or a hand-drawn line by a user, and including the object.

The detecting of mesh boundary of the object may include: specifying an initial mesh size; forming a mesh based on the edge according to the specified mesh size; and detecting the mesh boundary from the formed mesh.

The correcting of the mesh boundary may include: detecting a candidate node containing the mesh boundary based on the mesh size that is reduced by one layer; and by taking the detected candidate node as a seed, expanding a region to a specified area adjacent to the mesh boundary.

In the detecting of the mesh boundary, the mesh boundary may be detected until all boundary of the object is visited according to priority of detecting a mesh block containing a next edge from a current mesh block. The priority may be defined based on a left-hand method and a right-hand method.

Referring to a motion direction from a previous mesh block to a current mesh block, the priority may be defined according to the left-hand method and the right-hand method on the basis of a virtual line perpendicular to the motion direction.

In the detecting of the mesh boundary, a chain coding method may be used.

In the expanding of the region, a local region growing method taking a candidate node detected in an immediately previous layer as a seed may be used.

The specified precision may indicate a precision that as the result of repetitive reduction of the mesh size from an upper layer to a lower layer, the mesh size of a current layer is the same as a specified threshold.

The threshold may indicate the size of one pixel.

According to another aspect of the present invention, there is provided an image segmenting method, including: selecting a region of interest including an object whose image is to be segmented; detecting an edge of the object; specifying a mesh size; forming a mesh using a layered mesh structure based on the detected edge; detecting a mesh boundary of the object; determining whether the mesh size is 1; reducing the mesh size by one layer when the mesh size is not 1; correcting the mesh boundary using areas adjacent to the detected mesh boundary; generating a mask filling an inside area of the corrected mesh boundary; and image masking the object.

According to another aspect of the present invention, there is provided An image segmenting unit, including: a selecting section selecting a region of interest including an object whose image is to be segmented; an edge detecting section detecting an edge of the object; a specifying section specifying a mesh size; a forming section forming a mesh using a layered mesh structure based on the detected edge; a boundary detecting section detecting a mesh boundary of the object; a size determining section determining whether the mesh size is 1; a size reducing section reducing the mesh size by one layer when the mesh size is not 1; a boundary correcting section correcting the mesh boundary using areas adjacent to the detected mesh boundary; a mask generator generating a mask filling an inside area of the corrected mesh boundary; and an image masking section performing image masking of the object.

According to other aspects of the present invention, there are provided a computer-readable recording media encoded with processing instructions for causing a processor to perform the methods described above.

Additional and/or other aspects and advantages of the present invention will be set forth in part in the description which follows and, in part, will be obvious from the description, or may be learned by practice of the invention.

BRIEF DESCRIPTION OF THE DRAWINGS

The above and/or other aspects and advantages of the present invention will become apparent and more readily appreciated from the following detailed description, taken in conjunction with the accompanying drawings of which:

FIG. 2, parts (A)-(D), illustrates an example of the operation of selecting a region of interest;

FIG. 3 illustrates an example of the operation of detecting an edge and making layers of mesh sizes;

FIG. 6 illustrates an example of a formed mesh formed using the process illustrated in FIG. 5;

FIG. 7, parts (A) and (B), illustrates am example of the operation of detecting a mesh boundary of an object from a mesh structure, explaining a left-hand method and a right-hand method;

FIG. 8, parts (A) and (B), illustrates detection priority tables according to a direction index the mesh boundary detection process illustrated in FIG. 7;

FIG. 9, parts (A) and (B), illustrates an example of mesh boundary detection of an object according to an embodiment of the present invention;

DETAILED DESCRIPTION OF EMBODIMENTS

Figure 1:
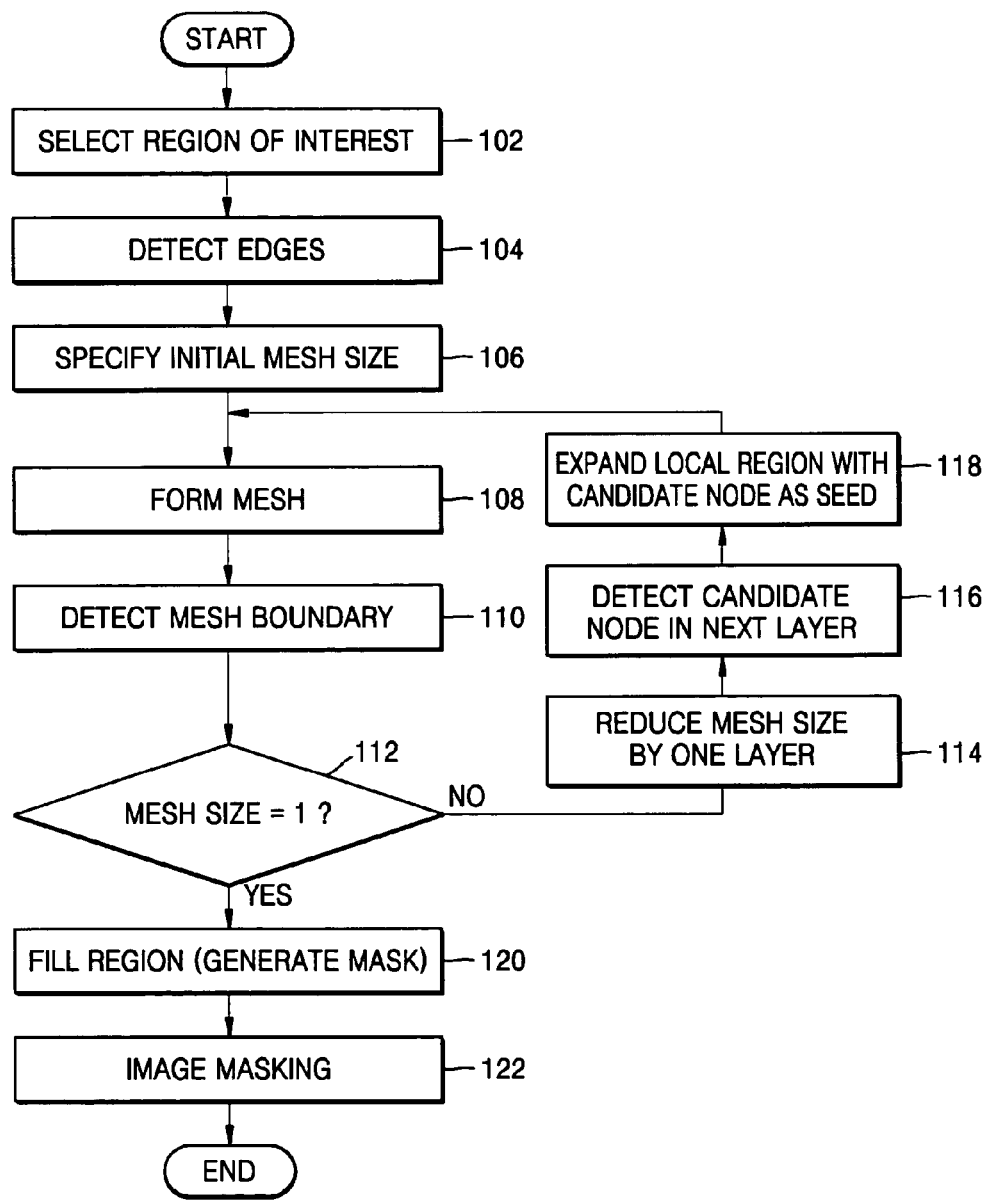
FIG. 1 is a flowchart of the operations an image segmentation method using a layered mesh structure according to an embodiment of the present invention.

Reference will now be made in detail to embodiments of the present invention, examples of which are illustrated in the accompanying drawings, wherein like reference numerals refer to the like elements throughout. The embodiments are described below in order to explain the present invention by referring to the figures.

Referring to FIG. 1, a method for efficiently segmenting an image according to an embodiment of the present invention includes: selecting a region of interest including an object whose image is desired to be segmented in operation 102; detecting the edge of the object in the region of interest in operation 104; specifying an initial mesh size in operation 106; forming a mesh by using a layered mesh structure based on the detected edge in operation 108; detecting the mesh boundary of the object in operation 110; determining if the mesh size is 1 in operation 112; reducing the size of the mesh by one layer in operation 114 if it is determined that the mesh size is not 1; correcting the mesh boundary by using areas adjacent to the detected mesh boundary in operations 116 through 118; until a specified precision is obtained in operation 112, repeatedly performing operations 108 through 118;

generating a mask to fill the inside area of the corrected mesh boundary in operation 120; and performing image masking of the object in operation 122.

First, a region of interest including an object desired to be extracted is selected in operation 102. Generally, the region of interest is input by a user, because it is difficult for a machine to know clearly which is an object desired to be extracted.

Next, in order to identify a rough outline of an object in the region of interest, an edge is detected in operation 104. The leading method is Sobel's edge detector, but other edge detection methods can also be used.

Also, in order to divide an image, an initial mesh size is specified in operation 106. The initial size of the mesh can be specified appropriately, for example, as a 32×32 pixel unit, a 16×16 pixel unit, or an 8×8 pixel unit. The initial mesh size is reduced one layer by one layer in a process repeating operations 108 through 118. For example, assuming that the first layer, that is, the size of the initial mesh, is a 32×32 pixel unit, the mesh size of the second layer will be reduced to 16×16, half the size of the initial mesh. The mesh size of the third layer will be reduced again to 8×8, half the mesh size of the second layer, and that of the fourth layer will be reduced to 4×4, that of the fifth layer will be reduced to 2×2, and finally the mesh size of the sixth layer will be reduced to 1×1. When the mesh size is a 1×1 pixel unit, repetition of the loop is stopped and the image is masked. Hereinafter, repeating image segmentation with reducing the mesh size by half will be referred to as 'image segmentation using a layered mesh structure'.

Now, based on the specified size of a mesh in operation 106, by using the edge detected in operation 104, a mesh is formed in operation 108. The formed mesh shows a rough outline of the object at a current layer. Also, based on the formed mesh structure, a mesh boundary is detected in operation 110. In particular, in the present embodiment, by using a left-hand method and a right-hand method to be explained later, the boundary is detected. According to this method, a continuous boundary can be detected seamlessly.

Next, the size of the current mesh is reduced by one layer in operation 114, and a candidate node at the next layer is detected in operation 116. With taking the detected candidate node as a seed, region growing, which is to be explained later, is performed in operation 118. That is, with the candidate node as a seed, the region is expanded in all directions to a boundary having image characteristics, such as an edge, a mean value, and color, different from those of the seed. After the region is expanded to a specified area adjacent to the detected mesh boundary, by performing an operation for forming a mesh at the next layer and detecting the boundary, the boundary can be corrected even when part of the object is cut off or part of another object is incorrectly included. Hereinafter, the operations 114 through 118 will be referred to as 'an operation for correcting the boundary of a mesh'. The loop (operations 108 through 118) is repeatedly performed until a desired precision is obtained. For example, as shown in FIG. 1, when the mesh size becomes a 1×1 unit, repetition of the loop stops and the image is masked. This loop may not be repeated when necessary, or a repetition frequency may be specified beforehand such that when a desired result is achieved within the frequency, repetition can be stopped.

Next, if a desired precision is arrived at in operation 112, a mask to fill the inside area of the mesh boundary is generated in operation 120, and the object image is masked in operation 122. Accordingly, a desired object can be accurately extracted from the image.

As previously described, the conventional image segmentation methods require a huge amount of computation in order to detect the boundary of an object, and in some cases, fails to find a continuous boundary. The present embodiment addresses this by providing an image segmentation method using a layered mesh structure.

That is, in this image segmentation method, the object itself is not expressed in a mesh structure, but the boundary of the object, that is, the mesh boundary, is detected and processed. Accordingly, in relation to the inside of the object, unnecessary searching is not performed, and only the boundary of the object is processed such that the amount of computation can be reduced compared to that of the conventional image segmentation methods. Also, by using a layered mesh structure, if an object with a desired precision is obtained, the processing operation can be stopped at any layer such that unnecessary computation can be reduced.

In addition, in this image segmentation method, in order to correct an initially set predicted boundary value, searching areas adjacent to an object boundary is performed in each layer expressed in a mesh structure. That is, the boundary is corrected hierarchically by reducing the size of a mesh along the layers from an upper layer using a relatively larger mesh to a lower layer using a smaller mesh. Accordingly, even when part of the object is cut off or a part not included in the object is included, the object can be extracted more accurately.

Furthermore, in this image segmentation method, by predicting connectivity of a boundary beforehand at an upper layer, more accurate and continuous object boundary can be detected. At this time, in order to find the boundary in a connected form, a local region growing method having the result of the previous layer as a seed is used.

Thus, the image segmentation method using a layer mesh structure according to the present embodiment reduces the amount of computation by reducing the number of objects used for calculation as the layer is lowered, and by using the result of the upper layers, can perform image segmentation stably.

The image segmentation method using a layered mesh structure according to the present embodiment will now be explained in more detail.

FIG. 2, parts (A)-(D), illustrates an example of operations for performing operation 102; selecting a region of interest.

Due to complexity and ambiguity of an object, automatic segmentation algorithms are used only in special circumstances. Accordingly, in the initial stage of image segmentation, generally, a user selects a region of interest including an object whose image is desired to be segmented. That is, meaningful objects in an image can be selected as a region of interest.

Referring to FIG. 2, various sizes of quadrangles, polygons, circles, ovals, or hand-drawn lines can be used to define a region of interest. A plurality of areas selected by using a variety of shapes can be combined into one region of interest by applying rules such as an intersection set, a union set, and XOR. Thus, by a user selecting the region of interest, even when a plurality of objects are included in an image, an object with high importance which the user is interested in can be selected first as the region of interest and divided.

FIG. 3 illustrates an example of operations for performing operations 104 and 106-114; detecting an edge and making layers of mesh.

As a method for detecting an edge, a generally known algorithm can be used. For example, an algorithm such as Sobel's edge detector can be used. As a result of edge detection, a rough outline of an object can be identified. However, since this outline is expressed roughly by fragments of individual edges, it cannot express a continuous boundary of the object. In order to find a connected boundary of the object from the fragments of individual edges, a layered mesh structure is used in the present invention.

Referring to FIG. 3, shown is a process in which an edge is predicted from the selected region of interest, a mesh is formed hierarchically in relation to the predicted edge, and the boundary is connected.

More specifically, for example, at layer k, the edge can be detected in 3 mesh blocks among 4 mesh blocks. The mesh structure is obtained by connecting the centroids of each candidate block (i, j). Accordingly, in order to form a mesh, first, centroids of mesh blocks containing the edge, that is, candidate blocks (i, j), should be obtained. Centroid (Cx, Cy) can be obtained by using the following equations 1 and 2:

$$C_x^{i,j} = \frac{\sum_{k=0}^{BS-1}\sum_{l=0}^{BS-1} k \cdot E(i*BS+k, j*BS+l)}{\sum_{k=0}^{BS-1}\sum_{l=0}^{BS-1} E(i*BS+k, j*BS+l)} \quad (1)$$

$$C_y^{i,j} = \frac{\sum_{k=0}^{BS-1}\sum_{l=0}^{BS-1} l \cdot E(i*BS+k, j*BS+l)}{\sum_{k=0}^{BS-1}\sum_{l=0}^{BS-1} E(i*BS+k, j*BS+l)} \quad (2)$$

Here, i and j are indices indicating candidate blocks containing an edge among mesh bocks, and BS denotes the size of a mesh block, E(,) indicates edge information. Between images, luminance values easily change, but edge values are not influenced much by luminance values and do not change much. Accordingly, it can be advantageous to use edge information.

If centroids of candidate blocks containing the edge obtained by equations 1 and 2 are all connected, a mesh can be formed.

Referring to FIG. 3 again, shown is an example where when 3 candidate blocks in layer k contain the edge, centroids (Cx, Cy) of the candidate blocks are obtained according to the above equations and expressed by 3 node points.

Next, at layer (k+1) where the mesh size is halved, the number of candidate blocks containing the edge is 7. Centroids of respective candidate blocks are obtained according to the above equations and expressed by 7 node points. Now, at layer (k+2) where the mesh size is again halved, the number of candidate blocks containing the edge is 15, and also, 15 node points can be expressed. As shown in FIG. 3, as the layering with decreasing the mesh size is proceeding, a more accurate boundary of the object can be detected.

Figure 4:
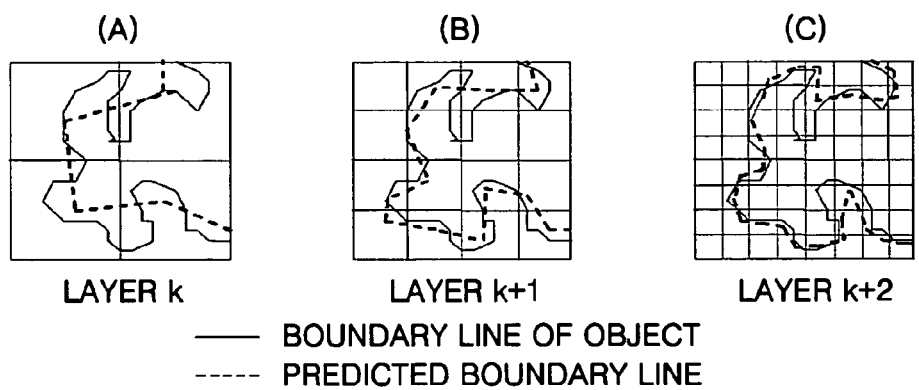
FIG. 4, parts (A)-(C), illustrates an example of the operation of correcting a boundary of an object having a complex shape, by using a layered mesh structure.

FIG. 4, parts (A)-(C), illustrates a method of correcting a boundary of an object having a complex shape, by using a layered mesh structure according to an embodiment of the present invention.

Referring to FIG. 4, shown is an example of detecting the boundary of a more complex object such as a coastline. As the layering is proceeding from an upper layer having a relatively bigger mesh size (part (A)), to an intermediate size (part (B)), to a lower layer having a smaller mesh size (part (C)), a more accurate boundary of an object can be detected gradually.

Figure 5:
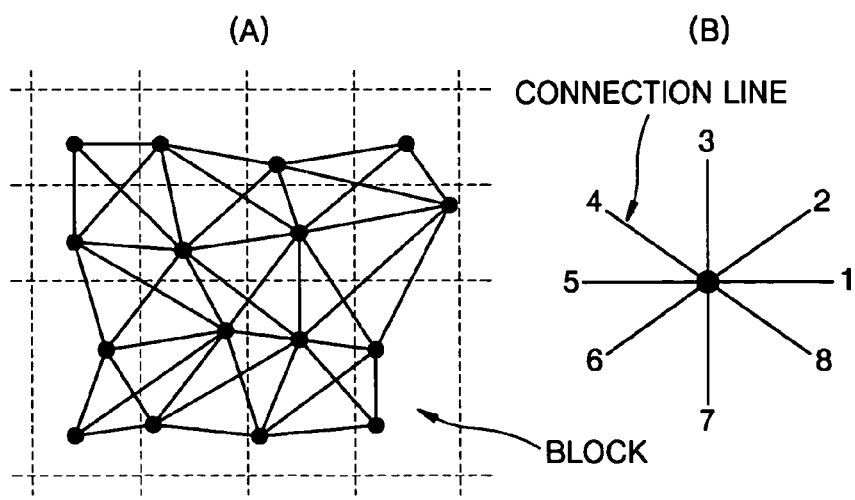
FIG. 5, parts (A) and (B), illustrates an example of the operation of forming a mesh according to an embodiment of the present invention.

FIG. 5, parts (A) and (B), illustrates an example of operations for performing operation 108; forming a mesh.

There are a variety of methods for forming a mesh, and in particular, a leading method is that using Delaunay triangulation. Referring to FIG. 5, shown is a method of forming a triangular mesh structure by using 8-connection-line information for a simple and normalized triangle structure (part (A)). The location of each vertex indicates the centroid of each candidate block calculated by using equations 1 and 2 described above (part (B)).

FIG. 6 illustrates an example of a mesh formed according to the operations illustrated in FIG. 5.

Referring to FIG. 6, shown is an example in which an image is expressed by using Delaunay triangle. Here, i and j denote indices indicating each mesh block. As described above, from each of mesh candidate block containing fragmental edges obtained in operation 104, the centroid is obtained and by connecting individual centroids according to the method shown in FIG. 5, a mesh is formed in operation 108. The result of the forming of the mesh is shown in FIG. 6. Through the formed mesh, the region of the object in the image can be known.

A method for detecting a boundary from the formed mesh will now be explained.

FIG. 7, parts (A) and (B), illustrates an example of operations for performing operation 110; detecting a mesh boundary of an object from a mesh structure, and explaining a left-hand method and a right-hand method.

Referring to FIG. 7(part A), a direction index (DIR) means a variable storing a motion direction from a previous block to a current block after converting the motion direction into a number. That is, when the motion direction from a previous block to a current block is indicated by an arrow as shown in the figure, a number from 1 to 8 is assigned to each of all possible directions and the number is stored. Direction index information is used in a priority table for detecting a boundary, which will be explained later.

Meanwhile, referring to the top left hand side of FIG. 7(part B), shown is a priority for detecting a boundary according to a left-hand method. Here, the arrow is a direction index (DIR) described above and according to the method of FIG. 7(part A), has a direction index value (DIR) of '1'. With a virtual line perpendicular to the direction index as a basis, priority of search is lowering in the direction from the right hand side to the left hand side. To help understanding, the priority of block search is expressed by a number. It is assumed that priority becomes higher with decreasing number. Meanwhile, in case of the top left hand side, the priorities of search from the right hand side of the virtual line (expressed by a dash-dot line) are expressed as numbers. On the top right hand side, the priorities of search in case where the direction index value is '4' are expressed by numbers.

In the same manner, referring to the bottom of FIG. 7(part B), detection priorities of a boundary according to a right-hand method are shown. However, there is an only difference that priority becomes lower in the direction from the right side of the virtual line to the left side.

A priority table can be prepared so that priorities according to the left-hand method and right-hand method using the respective direction indices shown in FIG. 7(part A) can be known at a glance.

FIG. 8, parts (A) and (B), illustrates detection priority tables according to a direction index in a mesh boundary detection method shown in FIG. 7. Referring to FIG. 8, according to the left-hand method (part (A)) and right-hand method (part (B)), and according to the direction index of 8 directions, priorities of boundary detection are shown clearly.

FIG. 9, parts (A) and (B), illustrates an example of mesh boundary detection of an object according to the present embodiment.

The process of detecting the boundary of a mesh using the priority table described above will now be explained.

1) While performing raster scan from the top left hand side of an image, a block containing an edge which is first found is searched for. With the location of the found block as a start position, a boundary is first detected by using the left-hand method or the right-hand method.

2) From the current position, according to the priority table described above, a mesh block containing an edge is searched for. If a block containing an edge is not found any more, it means the bottom boundary of the object is arrived at. Accordingly, by returning to the latest start point, a different direction is searched by reversely applying the right-hand method or the left-hand method. This detection process is repeated until all bottom boundaries of the object are arrived at.

3) In particular, in a mesh block containing each edge, based on the index value (DIR) and according to the priority table described above, a mesh block including a next edge is detected.

4) If mesh boundary detection of the object is finished, the size of the mesh block is reduced to one layer lower, and along the obtained boundary of the object, local region growing is performed with taking the block size of the previous layer as the limit of the growing range. That is, the size of expanded region should be equal to or less than the block size of the upper layer.

5) These processes are repeated until a pixel unit level precision or a precision desired by the user is obtained.

Referring to FIG. 9, shown is a process detecting the boundary of a mesh from the mesh structure shown in FIG. 6.

First, a block containing an edge first found while raster scan is performed is a mesh block at (0,5) position. The result of detecting a boundary by applying the left-hand method and right-hand method from this position is shown in part (B).

For example, a boundary detection method in an area indicated by dotted lines on the left hand side of part (A) of FIG. 9 will now be explained. This is a case where a current block is located at position (2,4), and the previous block is (1,5). The search order of blocks to detect a boundary is determined according to the direction index that is expressed by a dotted line arrow and is a motion direction from the previous to the current block. In this case, as shown in FIG. 7, the direction index is '6'. Referring to the priority table according to the left-hand method shown in FIG. 8 corresponding to this, the highest detection priority is on the top left hand side as shown on the top left hand side of part (A) of FIG. 9. If a boundary containing an edge is detected according to this priority, a block at position (1,3) corresponding to priority 1 can be found.

In the same manner, the boundary of a mesh can be detected in the remaining blocks, by referring to the priority table using the direction index. The result is shown in part (B) of FIG. 9. In particular, the 12th block and the 17th block indicate an identical block at (8,2). This means that there is a small branch formed as a closed curve in addition to an object desired to be extracted. Accordingly, it is preferable to remove a part marked as 'A' in part (B) of FIG. 9, from the boundary part. Also, the 18th block at position (9,1) means that the bottom boundary of the object is arrived at because a block containing an edge cannot be found any more. Accordingly, by returning to the block at the start position, the boundary detection is continued according to the right-hand method in the opposite direction. That is, from the 19th block, search is continued according to the right-hand method from position (0,5) where the first search started.

To sum up, boundary detection begins by the left-hand method, arrives at the bottom boundary surface of the image at the 18th position, and returns to the 0-th position that is the previous start position. Then, by applying the right-hand method in the opposite direction, boundary detection is continued. In particular, the accompanying small branches found between the 13th and 17th blocks are removed and processed such that a boundary with a closed shape is generated. At this time, whether to apply the left-hand method or the right method first is only a matter of selection.

Meanwhile, the method for detecting a boundary using the left-hand method and the right-hand method according to the above-described embodiments of the present invention is an improved chain coding method that can be applied to a variety of other fields. This method has an advantage that it can be used for natural images as well as binary images.

Now, with taking the detected boundary blocks as candidate regions, region growing is performed to a specified area in operation 118. In the region growing, a candidate region is taken as a seed and expanded in all directions to a boundary having different image characteristics such as edge, mean values, and color. The result of region growing plays a role of correcting the detection result of the boundary at a lower layer. This is because it plays a role of returning a part of an object incorrectly cut off in the upper layer.

Figure 10:
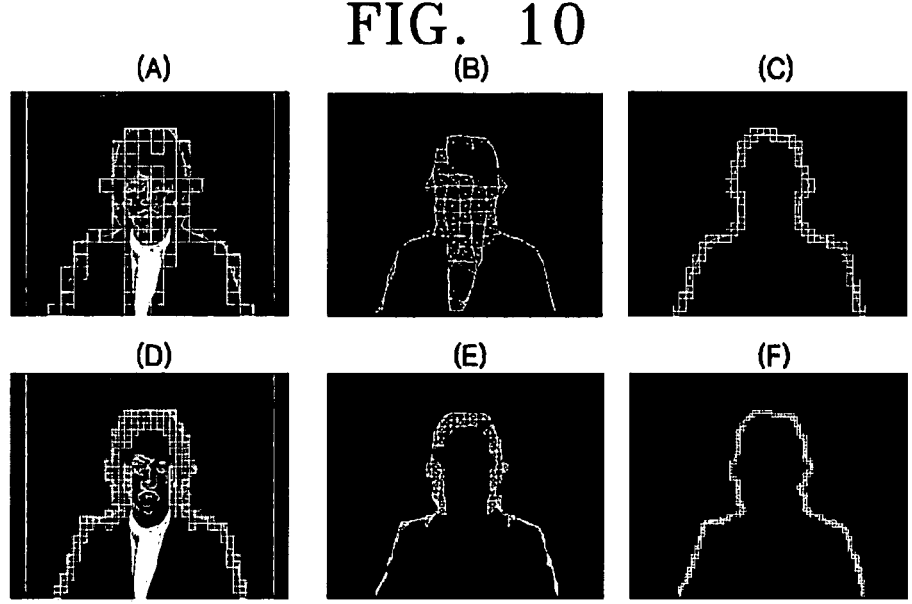
FIG. 10, parts (A)-(F), illustrates a process segmenting an image by using a layered mesh structure in two layers according to an embodiment of the present invention.

FIG. 10, parts (A)-(F), illustrates a process segmenting an image by using a layered mesh structure in two layers according to an embodiment of the present invention.

Referring to FIG. 10, the first picture on the top left hand side (part (A) shows the result of obtaining candidate blocks containing the edge in order to form a mesh at layer k. Next, the picture at the top center (part (B)) shows the result of forming a mesh by obtaining centroids of candidate blocks. It can be seen that the mesh is formed inside the object as well as on the boundary part of the mesh. Next, the top right hand side picture (part (C)) shows candidate blocks containing the edge when the mesh boundary is detected and the mesh size is reduced by one layer. Next, the bottom left hand side picture (part (D)) shows the result of region growing to a specified area adjacent to blocks containing the edge in order to correct the boundary at layer (k+1). At this time, the region of growing is limited to the block size of layer k on the top left hand side. Next, the bottom center picture (part (E)) shows an example of forming a mesh, and the bottom right hand side picture (part (F)) shows candidate blocks when the mesh boundary is detected and the mesh size is reduced by one layer. This process is repeatedly performed until the mesh size becomes 1 pixel unit or a desired precision is obtained.

Figure 11:
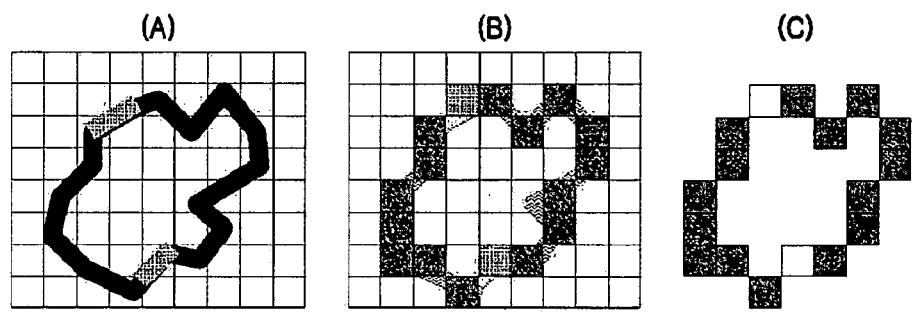
FIG. 11, parts (A)-(C), illustrates an example of a fragmentation problem in segmenting an image.

FIG. 11, parts (A)-(C), illustrates an example of a fragmentation problem in segmenting an image.

When the boundary of an object is searched for in an image, arises a problem that the boundary does not continue and is cut off because edge information of the object boundary is not correctly set. This is referred to as a fragmentation problem. Referring to FIG. 11, a process in which the fragmentation problem occurs is shown. That is, because an edge value is too small to be distinguished from adjacent values, a part where the boundary is cut off in the middle occurs.

Figure 12:
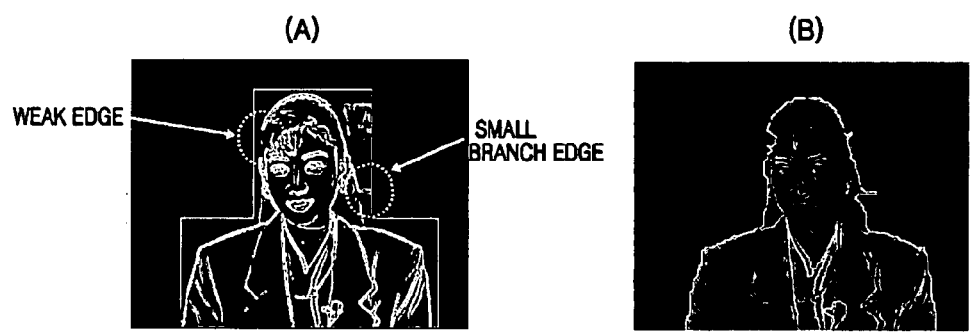
FIG. 12, parts (A) and (B), illustrates an example where a fragmentation problem occurs in an actual image.

FIG. 12, parts (A) and (B), illustrates an example where a fragmentation problem occurs in an actual image. Referring to FIG. 12, shown is an example where part of the boundary where edge information is weak is cut off or a small branch edge occurs due to an edge included in another object.

Figure 13:
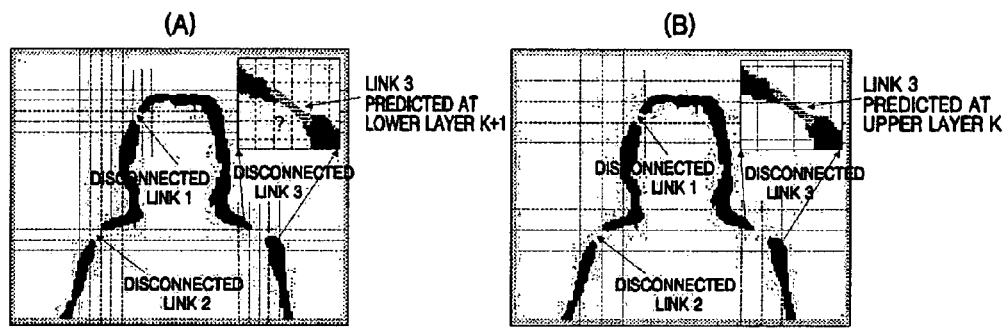
FIG. 13, parts (A) and (B), illustrates a method to solve a fragmentation problem by using a layered mesh structure.

FIG. 13, parts (A) and (B), illustrates a method to solve a fragmentation problem by using a layered mesh structure according to an embodiment of the present invention.

Referring to FIG. 13, an image segmentation method uses a layered mesh structure such that connectivity of an object boundary can be predicted in advance at an upper layer. Accordingly, even at a lower layer, more accurate and continuous object boundary can be detected. Even a part where an edge is cut off and which is difficult to predict at a lower layer as shown in the left hand side picture (part (A) of FIG. 13), can easily be predicted at an upper layer having a bigger mesh size as shown in the right hand side picture (part (B) of FIG. 13). Accordingly, when boundary detection is performed from an upper layer having a relatively bigger mesh size to a lower layer having a smaller mesh size as in the present embodiment, even in a part where edge information is weak, a more accurate and continuous object boundary can be predicted and detected.

Figure 14:
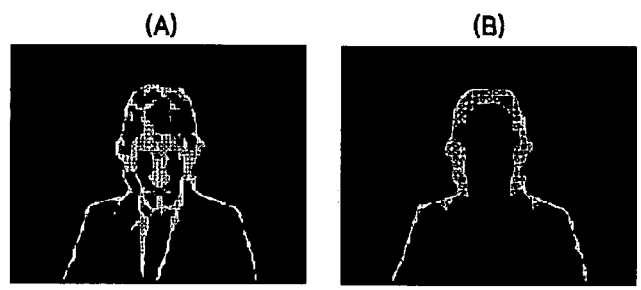
FIG. 14, parts (A) and (B), is a diagram comparing the amounts of computation for forming a mesh in an embodiment of the present invention and in the conventional technology.

FIG. 14, parts (A) and (B), is a diagram comparing the amounts of computation for forming a mesh in an embodiment of the present invention and in the conventional technology.

Referring to FIG. 14, the left hand side picture (part (A)) shows a mesh structure according to the conventional technology, while the right hand side picture (part (B)) shows a mesh structure according to the present invention. Since unnecessary computation for the inside of the object having nothing to do with the object boundary is performed in the conventional method, it has a problem of increasing the amount of computation. Meanwhile, in case of the present invention shown on the right hand side, computation only for the boundary of the object is performed such that the amount of computation can be reduced compared to that of the conventional technology.

Figure 15:
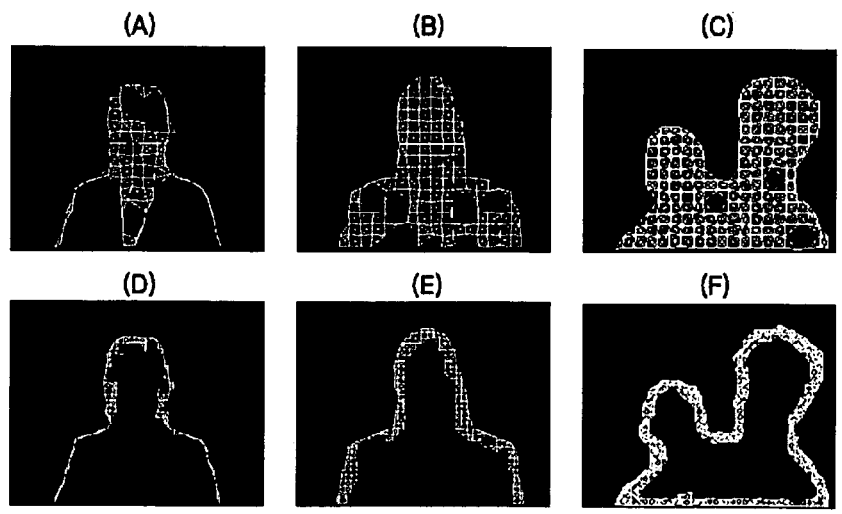
FIG. 15, parts (A)-(F), illustrates mesh structures in an upper layer and in a lower layer in an image segmentation method according to an embodiment of the present invention.

FIG. 15, parts (A)-(F), illustrates mesh structures in an upper layer and in a lower layer in an image segmentation method according to an embodiment of the present invention.

Referring to FIG. 15, in the image segmentation, since a process detecting the boundary of an object is performed at each layer, the number of objects used for computation can be reduced, as the layering is proceeding. Accordingly, the complexity and amount of computation can be reduced. Also, by using the boundary detection result of the previous layers, image segmentation can be performed stably. In FIG. 15, the mesh structure of each picture on the top is restricted by the mesh boundary of a corresponding picture at the bottom. That is, it can be seen that by performing a boundary detection process, the amount of computation decreases as the layering is proceeding.

Figure 16:
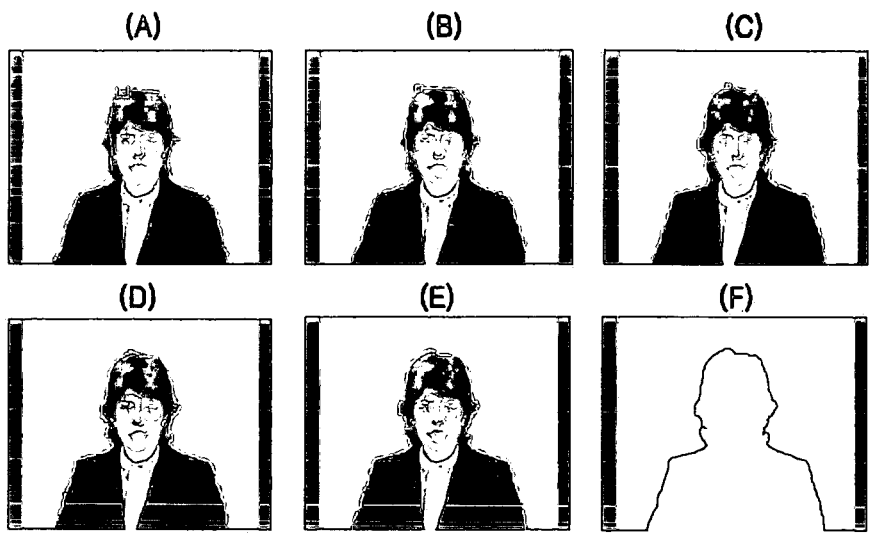
FIG. 16 parts (A)-(F), FIG. 17, parts (A)-(D), and FIG. 18, parts (A)-(D), illustrate the results of image segmentation using a layered mesh structure by a variety of embodiments of the present invention.
Figure 17:
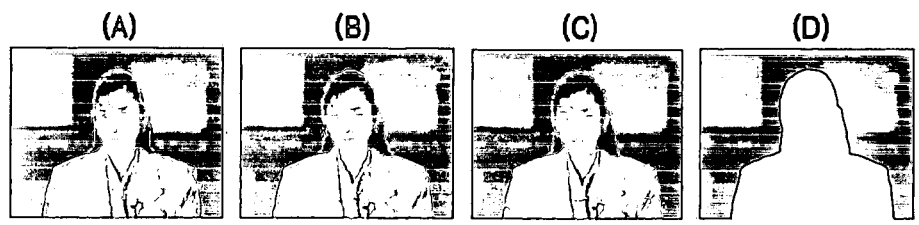
Figure 18:
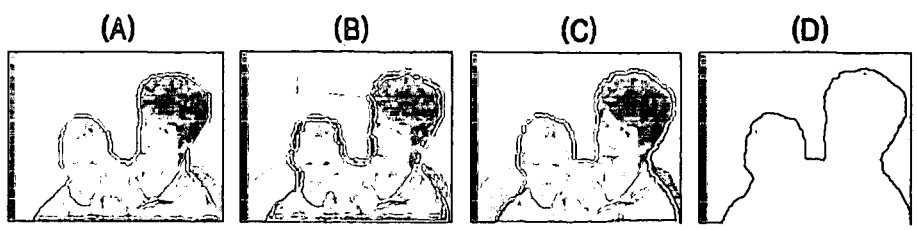

FIGS. 16 through 18 illustrate the results of image segmentation by a variety of embodiments using a layered mesh structure according to the present invention.

Referring to FIG. 16, parts (A)-(F), shown is a process extracting a desired object through multiple layers. It can be seen that while the layering is proceeding as illustrated sequentially by parts (A) through (F), the size of a mesh block shown in each picture is gradually decreasing, and as a result, a more accurate boundary of the object is obtained. As the last operation, the inside of the obtained boundary of the object is masked and the desired object can be extracted.

FIGS. 17, parts (A)-(D), and 18, parts (A)-(D), also show a process in which with the layering proceeding in the same manner, a more accurate boundary of an object is detected and the desired object is extracted. Thus, in the image segmentation method according to an embodiment of the present invention, even when part of an object is cut off or a part is incorrectly included in the object, the boundary is corrected from an upper layer using a relatively bigger mesh to a lower layer using a smaller mesh such that the object can be detected more accurately. That is, the connectivity of an object boundary is predicted at an upper layer such that a more accurate and continuous object boundary can be detected.

Embodiments of the present invention can also be embodied as computer readable codes on a computer readable recording medium. The computer readable recording medium is any data storage device that can store data which can be thereafter read by a computer system. Examples of the computer readable recording medium include read-only memory (ROM), random-access memory (RAM), CD-ROMs, magnetic tapes, floppy disks, optical data storage devices, and carrier waves (such as data transmission through the Internet). The computer readable recording medium can also be distributed over network coupled computer systems so that the computer readable code is stored and executed in a distributed fashion.

According to the above-described embodiments of the present invention, an image segmentation method using a layered mesh structure is provided. According to this, by using the layered mesh structure, the amount of computation can be reduced and a more accurate and continuous object boundary can be found.

That is, according to the image segmentation method of an embodiment of the present invention, a process detecting the boundary of an object is performed at each layer such that the connectivity of a boundary is predicted at an upper level and a more accurate and continuous object boundary can be detected. Also, in order to detect a continuous boundary seamlessly, the boundary detection result of the previous layer is taken as a seed and region growing is performed such that the boundary of the object can be corrected more accurately. Furthermore, as the layering is proceeding, the number of objects used for computation is reduced such that the complexity is reduced. Also, by using the result of the previous layers, image segmentation can be performed stably.

Although a few embodiments of the present invention have been shown and described, the present invention is not limited to the described embodiments. Instead, it would be appreciated by those skilled in the art that changes may be made to these embodiments without departing from the principles and spirit of the invention, the scope of which is defined by the claims and their equivalents.

What is claimed is:

1. An image segmentation method comprising:
   selecting a region of interest including an object whose image is to be segmented;
   detecting the edge of the object;
   using a processor for repeatedly performing, until a specified precision is obtained, a process in which by using a layered mesh structure based on the detected edge, a mesh boundary of the object is detected, a mesh size is reduced by one layer, and by using areas adjacent to the detected mesh boundary, correcting the mesh boundary; and
   generating a mask to fill an inside area of the correcting mesh boundary and masking the object.

2. The method of claim 1, wherein the region of interest is selected by combining at least one region distinguished by a circle, an oval, a polygon, or a hand-drawn line by a user, and including the object.

3. The method of claim 1, wherein the detecting of mesh boundary of the object includes:
   specifying an initial mesh size;
   forming a mesh based on the edge according to the specified initial mesh size; and
   detecting the mesh boundary from the formed mesh.

4. The method of claim 3, wherein the correcting of the mesh boundary includes:
   detecting a candidate node containing the mesh boundary based on the mesh size reduced by one layer; and expanding a region to a specified area adjacent to the mesh boundary by taking the detected candidate node as a seed.

5. The method of claim 3, wherein, in the detecting of the mesh boundary, the mesh boundary is detected until all of the boundary of the object is visited according to a priority of detecting a mesh block containing a next edge from a current mesh block, and the priority is defined based on a left-hand method and a right-hand method.

6. The method of claim 5, referring to a motion direction from a previous mesh block to a current mesh block, the priority is defined according to the left-hand method and the right-hand method on the basis of a virtual line perpendicular to a motion direction.

7. The method of claim 6, wherein, in the detecting of the mesh boundary, a chain coding method is used.

8. The method of claim 4, wherein, in the expanding of the region, a local region growing method taking a candidate node detected in an immediately previous layer as a seed is used.

9. The method of claim 1, wherein the specified precision indicates a precision that as the result of repetitive reduction of the mesh size from an upper layer to a lower layer, the mesh size of a current layer is the same as a threshold.

10. The method of claim 9, wherein the threshold indicates the size of one pixel.

11. computer-readable storage medium encoded with processing instructions for causing a processor to execute an image segmentation method, the method comprising:
   selecting a region of interest including an object whose image is to be segmented;
   detecting an edge of the object;
   repeatedly performing, until a specified precision is obtained, a process in which by using a layered mesh structure based on the detected edge, a mesh boundary of the object is detected, a mesh size is reduced by one layer, and correcting the mesh boundary using areas adjacent to the detected mesh boundary; and
   generating a mask to fill an inside area of the correcting mesh boundary and masking the object.

12. An image segmenting method, comprising:
   selecting a region of interest including an object whose image is to be segmented;
   detecting an edge of the object;
   specifying a mesh size;
   forming a mesh using a layered mesh structure based on the detected edge;
   detecting a mesh boundary of the object;
   determining whether the mesh size is 1;
   reducing the mesh size by one layer when the mesh size is not 1;
   using a processor for correcting the mesh boundary using areas adjacent to the detected mesh boundary;
   generating a mask filling an inside area of the corrected mesh boundary; and
   image masking the object.

13. The method of claim 12, wherein the region of interest is specified by a user.

14. The method of claim 12, wherein the edge of the object is detected using a Sobel algorithm.

15. The method of claim 12, wherein the initial mesh size is a 32×32 pixel unit.

16. The method of claim 12, wherein the mesh is formed using Delaunay triangulation.

17. An image segmenting unit, comprising:
   a selecting section selecting a region of interest including an object whose image is to be segmented;
   an edge detecting section detecting an edge of the object;
   a specifying section specifying a mesh size;
   a forming section forming a mesh using a layered mesh structure based on the detected edge;
   a boundary detecting section detecting a mesh boundary of the object;
   a size determining section determining whether the mesh size is 1;
   a size reducing section reducing the mesh size by one layer when the mesh size is not 1;
   a boundary correcting section correcting the mesh boundary using areas adjacent to the detected mesh boundary;
   a mask generator generating a mask filling an inside area of the corrected mesh boundary; and
   an image masking section performing image masking of the object.

* * * * *

UNITED STATES PATENT AND TRADEMARK OFFICE
CERTIFICATE OF CORRECTION

| | | |
|---|---|---|
| PATENT NO. | : 7,512,270 B2 | Page 1 of 1 |
| APPLICATION NO. | : 11/193463 | |
| DATED | : March 31, 2009 | |
| INVENTOR(S) | : Dong-keun Lim | |

It is certified that error appears in the above-identified patent and that said Letters Patent is hereby corrected as shown below:

Column 13, Line 10, change "referring" to --wherein referring--.

Column 13, Line 27, change "computer-readable" to --A computer-readable--.

Signed and Sealed this

Sixteenth Day of June, 2009

JOHN DOLL
*Acting Director of the United States Patent and Trademark Office*